United States Patent [19]

Brady

[11] Patent Number: 4,482,327
[45] Date of Patent: Nov. 13, 1984

[54] APPARATUS AND METHOD FOR TRAINING A PERSON TO POUR PREDETERMINED QUANTITIES OF LIQUIDS INTO CONTAINERS

[76] Inventor: David A. Brady, 5024 Worth, Dallas, Tex. 75214

[21] Appl. No.: 493,309

[22] Filed: May 10, 1983

[51] Int. Cl.³ .............................................. G09B 19/00
[52] U.S. Cl. .................................................. 434/219
[58] Field of Search .............. 434/219, 276, 298, 300, 434/365, 433; 73/149, 426, 427, 428, 429

[56] References Cited

FOREIGN PATENT DOCUMENTS 817975 10/1951 Fed. Rep. of Germany ........ 73/149

OTHER PUBLICATIONS

Welch Scientific Co. Catalog "Scientific Apparatus and Supplies", ©1965 Title Page, pp. 591,594.

*Primary Examiner*—William H. Grieb
*Attorney, Agent, or Firm*—Hubbard, Thurman, Turner & Tucker

[57] ABSTRACT

Apparatus for training and testing persons for pouring predetermined quantities of liquid in the mixing and preparation of beverages. The apparatus includes a frame having a backwall and spaced apart support members for supporting a plurality of transparent graduated tubular containers. Each container is marked with graduations indicating incremental quantities of liquid correlated with indicia printed on the containers and/or on the frame adjacent to the mouths of the respective graduated containers. The apparatus is particularly useful in training and testing persons for free pouring beverages and beverage ingredients in the retail liquor service industry. A testing method using the apparatus includes positioning the apparatus so that the trainee cannot view the containers during test pouring operations. Test scores are recorded on a score sheet having printed facsimiles of the graduated containers.

18 Claims, 4 Drawing Figures

APPARATUS AND METHOD FOR TRAINING A PERSON TO POUR PREDETERMINED QUANTITIES OF LIQUIDS INTO CONTAINERS

BACKGROUND OF THE INVENTION

1. Field of the Invention

The present invention pertains to an apparatus and method for training bartenders and the like to pour predetermined quantities of liquids into ungraduated containers.

2. Background

In the preparation of mixed drinks and other beverages in the retail liquor service industry, it is important to accurately measure the amount of liquid poured into the serving container in order to prepare certain beverages according to a recipe and in order to provide the customer with the customary or standard measured quantity of beverage. Various types of measuring devices have been used in the bartending trade including, for example, the classic jigger or "shotglass" type measuring container. The use of this item in preparing mixed drinks and other beverages is time consuming, relatively inaccurate and is often subject to suspicion by the patron. Moreover, inaccuracies in overpouring expensive alcoholic drinks can result in substantial lost profits in establishments doing relatively large volumes of business.

Various devices have been developed to more accurately measure the quantities of liquid poured into ungraduated mixing and serving containers. Automatic dispensing systems which dispense premeasured quantities of liquid have been developed, however, these systems are expensive and are not easily adapted to dispense a wide variety of liquids and component beverage ingredients typically found in a well stocked bar or lounge. Moreover, the automatic dispensing systems also convey a somewhat mechanized image to the patron which is not in keeping with the atmosphere desired in most restaurants and drinking establishments.

Certain other measuring devices have been developed including those which fit onto the bottle or container from which the liquid is dispensed and which measure out a predetermined quantity during the pouring process. However, these devices are cumbersome to use, are relatively slow in operation, subject to malfunction and are fairly unattractive when mounted on the dispensing container or bottle.

In view of the shortcomings of prior art measuring devices and processes, the trend in the retail liquor service industry has been to utilize so called "free pouring" of measured quantities of beverages and beverage ingredients in the bartending trade. Free pouring, of course, requires skill on the part of the bartender to accurately measure the quantity being poured without actually utilizing a graduated pouring or receiving container. This process requires training and practice and also requires testing of bartender trainees, and from time to time veteran practitioners, to sharpen their pouring skills. Heretofore, bartenders have been trained to perform the so called free pouring operation by simply pouring liquids from respective dispensing containers into an ungraduated container and then checking the accuracy of the pouring operation using a second container such as a jigger or shotglass. The accuracy of so called jigger or shotglass type containers is subject to judgment error by the bartender or instructor due to the formation of a concave or convex meniscus at the container mouth. The misreading of the quantity of liquid in a jigger or shotglass may result in as much as a fifteen percent error in volume actually poured during the training or testing process and, of course, in actual use.

Accordingly, there has been a need for a suitable apparatus which is adapted for training and testing those persons working in the retail liquor service industry, which apparatus is adapted for testing the pouring skills of an individual to pour a relatively large number of predetermined quantities of liquid without using graduated dispensing or receiving containers and without using any mechanical devices other than a conventional pouring spout fitted to the dispensing container or bottle.

SUMMARY OF THE INVENTION

The present invention provides a unique training and testing apparatus particularly adapted for use in training and testing persons for dispensing and preparing beverages and liquid beverage ingredients in the retail liquor service industry.

In accordance with one aspect of the present invention there is provided an apparatus comprising a plurality of graduated containers which are supported by a frame and are adapted to receive predetermined quantities of liquid during a pouring operation and to accurately indicate the quantity poured. The apparatus is particularly adapted for training and for testing the pouring skills of a person when pouring liquid from ungraduated containers, including those containers having standardized dispensing or pouring spouts. The graduated containers are associated with suitable indicia placed on the supporting frame and/or on the graduated containers themselves for indicating the amount of liquid to be poured into the containers to correspond to a primary volume indicating graduation on each of the containers. Each of the graduated containers also includes secondary graduations for indicating an acceptable margin of error and an unacceptable margin of error in the volume poured into the container.

In accordance with another aspect of the present invention there is provided a training and testing apparatus for calibrating the pouring skills of persons working in the retail liquor service industry comprising a frame for supporting a plurality of graduated containers which are of uniform size and cross-sectional shape wherein the person using the apparatus may develop or improve a sense of timing and visual perception of the quantity of liquid being dispensed during the pouring operation. By the provision of a plurality of containers of uniform size and shape which are marked with graduations indicating, respectively, a plurality of different predetermined volume measurements, a person using the apparatus may rapidly develop skills in pouring predetermined quantities of liquids from ungraduated containers, particularly those containers having a prescribed type of pouring spout. The graduated containers also are appropriately configured to exaggerate the visual perception of the error in the quantity poured. The apparatus of the present invention is also useful in improving the standards of acceptable pouring skills.

In accordance with still another aspect of the present invention there is provided an apparatus for training persons to pour measured quantities of liquids comprising a frame for supporting a plurality of graduated containers of uniform size and shape, which containers are disposed on the frame in alignment with each other, may be viewed by the trainee in one position of the frame for practicing one's pouring skills, and wherein the frame is provided with means for blocking the view of the trainee during a testing procedure so that the trainee must rely on his timing and perceived quantity of liquid being poured.

In accordance with yet a further aspect of the present invention there is provided an apparatus for training and testing persons for pouring predetermined selected quantities of liquids from ungraduated containers into other ungraduated containers wherein a plurality of separate graduated containers are supported by a frame and are easily emptied en masse for performing repeated pouring practice operations, and wherein the containers may be individually removed from the frame for replacement or cleaning, as required.

The present invention still further provides for an improved method of training and testing persons for the function of pouring predetermined quantities of liquids such as beverages and beverage ingredients from an ungraduated container to another ungraduated container. The method of the invention includes the provision of a test score sheet for use with an improved training and testing apparatus wherein, as a trainee is tested for his pouring skills, the test score achieved in the various pouring operations may be conveniently and permanently indicated on a facsimile of a series of graduated test and training containers. Moreover, the use of the apparatus and the training and testing method is uncomplicated and substantially self instructing.

Those skilled in the art of apparatus and methods pertaining to the present invention will appreciate the abovedescribed features and advantages as well as additional superior aspects of the invention upon reading the detailed description which follows in conjunction with the drawings.

DESCRIPTION OF THE PREFERRED EMBODIMENTS

Figure 1:
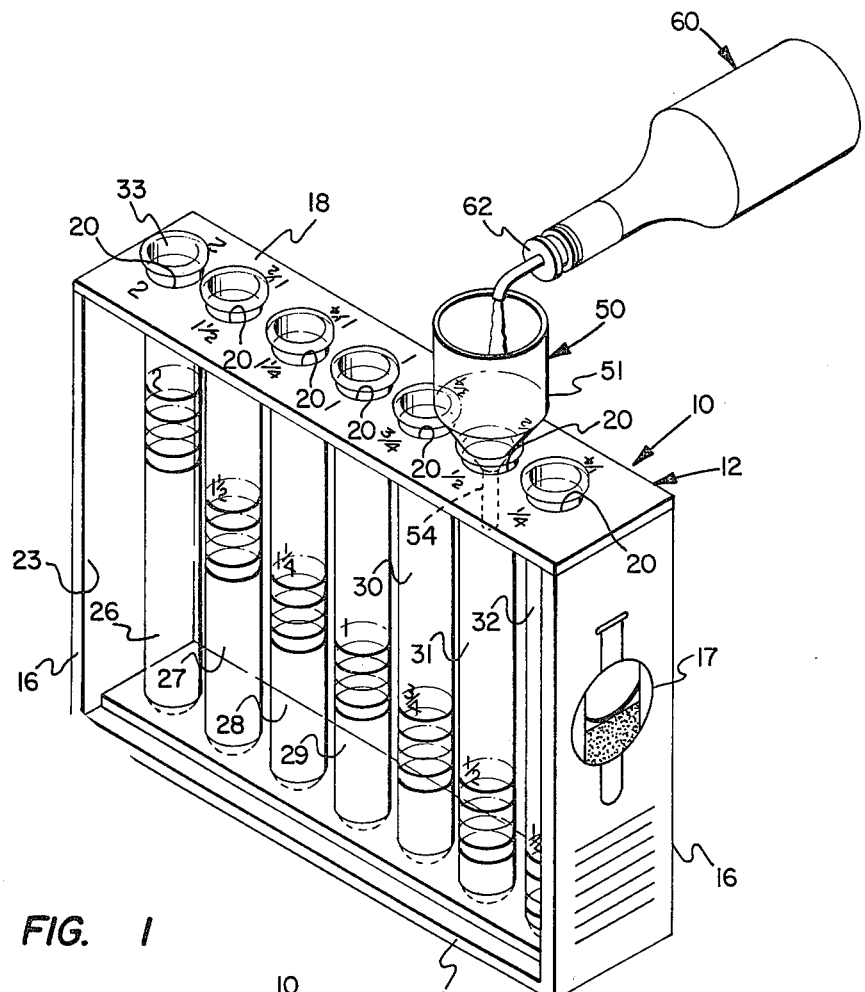
FIG. 1 is a perspective view of the apparatus of the present invention.

In the description which follows like parts are marked throughout the specification and drawings with the same reference numerals, respectively. The drawings are not necessarily to scale and certain features of the invention may be exaggerated in scale in the interest of clarity and conciseness.

Figure 2:
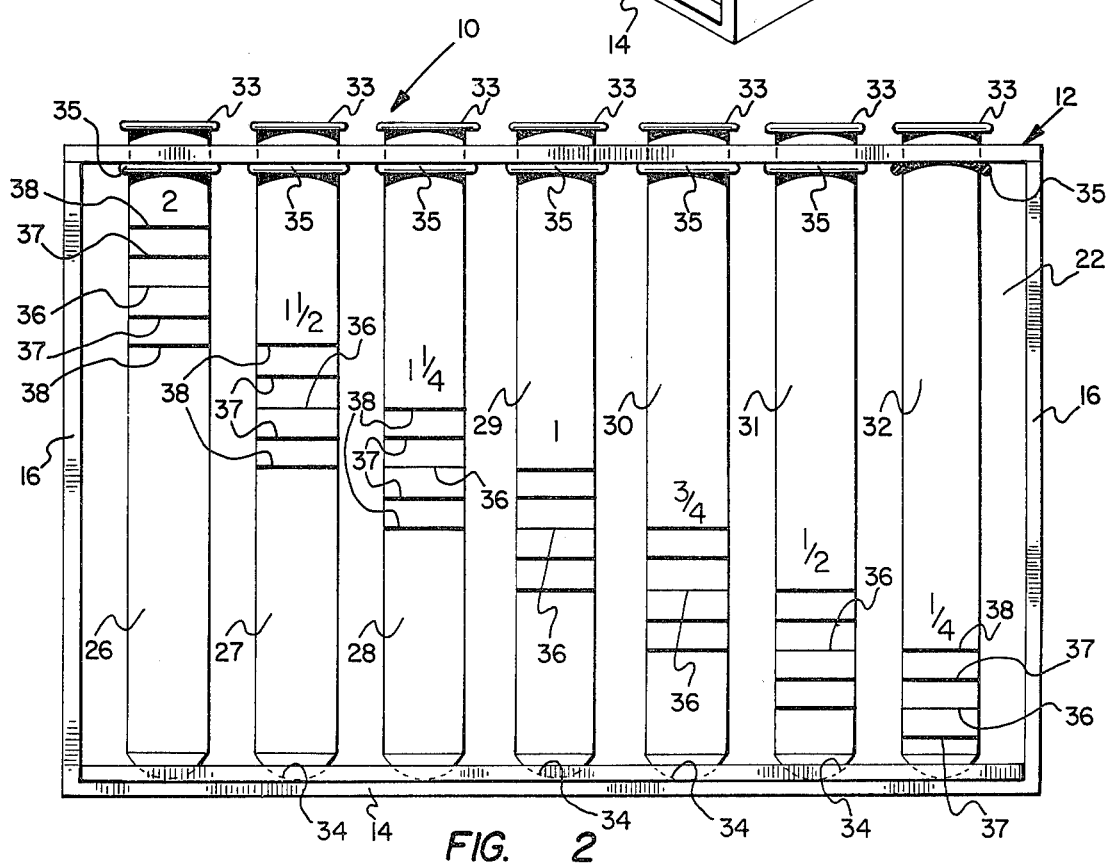
FIG. 2 is a front elevation of the apparatus illustrated in FIG. 1.
Figure 3:
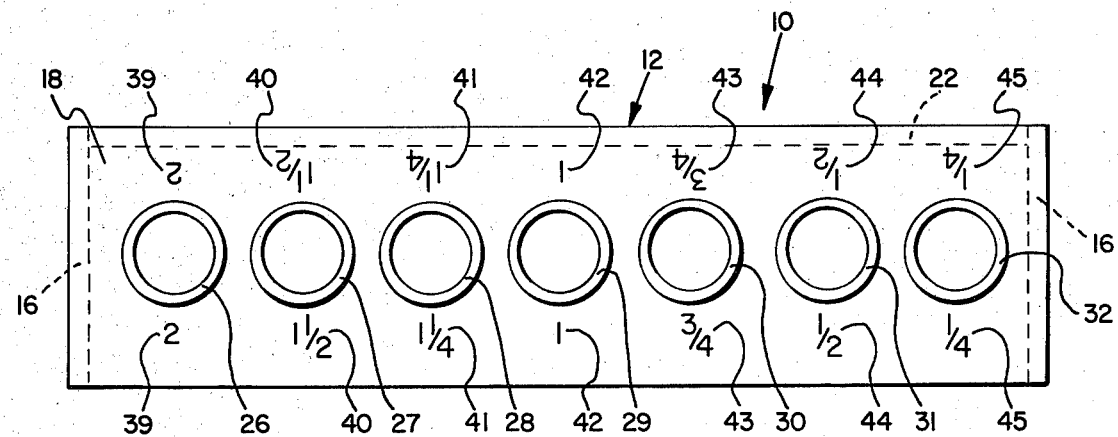
FIG. 3 is a top plan view of the apparatus.

Referring to FIGS. 1 through 3, in particular, there is illustrated an apparatus for training and testing persons for pouring predetermined quantities of liquids such as beverages and beverage ingredients from ungraduated or unmarked containers into other ungraduated or unmarked containers. The apparatus of the invention is generally designated by the numeral 10 and includes a substantially rectangular frame 12 comprising a generally horizontally extending base member 14, opposed vertical sidewalls 16 and a top member 18. The member 18 has a plurality of aligned, spaced apart circular openings 20 formed therein for receiving a plurality of graduated tubular containers to be described in further detail. The frame 12 also includes a backwall 22 for blocking the view of the aforementioned tubular containers when they are disposed in the openings 20 and extending substantially between the base member 14 and the top member 18. The frame 12 is open on one side at 23, as shown.

The aforementioned graduated containers are preferably provided in total number of seven and are respectively designated by the numerals 26, 27, 28, 29, 30, 31 and 32. Of course, fewer or greater members of graduated containers can be provided depending on the number of different pour quantities to be developed and tested. The graduated containers 26 through 32 are preferably of uniform size and comprise elongated cylindrical transparent glass or plastic tubes which have closed bottoms, an open mouth at the top and preferably include a small collar or flange 33 at the rim of the tube mouth. The containers 26 through 32 are of a length sufficient that they rest in slight recesses 34 formed in the base member 14 and their collars or flanges 33 extend only slightly above the top surface of the member 18. The containers 26 through 32 are each preferably retained on the frame by a resilient retaining collar or ring 35 similar to a conventional elastomeric o-ring or the like. The rings 35 are sized to fit snugly around the circumference of the containers 26 through 32 to prevent the containers from falling out of the frame 12 when it is inverted but to permit selective withdrawal of one or more of the tubular containers from the frame for cleaning or replacement, as required. The ring 35 disposed around the container 32 is sectioned for clarity.

The tubular containers 26 through 32 are each, respectively, provided with primary graduations or markings comprising a relatively thin circumferential band 36. The containers 26 through 32 also each include respective sets of spaced apart secondary graduations 37 and 38 disposed on opposite sides of the primary graduations 36 to indicate specific margins of error of the quantity of liquid in the respective containers in excess of or in deficiency of the prescribed quantity indicated by the primary graduations. For example, the primary graduation 36 of the container 26 indicates the volume of the container at that point as being two ounces (USCS fluid). The first set of secondary graduations 37 indicate one eighth ounce (USCS fluid) increments in excess or in deficiency of, respectively, the two ounce quantity. The second set of secondary graduations 38 indicate additional one eighth ounce (USCS fluid) increments, that is, the uppermost graduation 38 is one fourth ounce in excess of the two ounce quantity indicated by the primary graduation 36 and the lowermost secondary graduation 38 indicates a one fourth ounce deficiency of the two ounce quantity indicated by the primary graduation 36. The primary graduations 36 for each of the respective containers 26 through 32 are, in a preferred embodiment of the invention, located to indicate respectively, 2, 1½, 1¼, 1, ¾, ½ and ¼ ounces volume (USCS fluid). Accordingly, the lower secondary graduation for the container 32 is omitted. The containers 26 through 32 are preferably formed of relatively thin walled glass tubes of approximately 1.0 inch nominal outside diameter so that a clear distinction between the locations of the primary graduations of each of the containers is visually perceivable. The containers 26 through 32 also preferably include indicia printed thereon, as illustrated in FIGS. 1 and 2, indicating the volume referenced by the primary graduations 36 of each of the respective containers. The frame 12 is preferably made of an opaque plastic although other materials are suitable.

As shown in FIG. 3, the upper surface of the frame member 18 is also provided with indicia at 39, 40, 41, 42, 43, 44 and 45 indicating the volume corresponding to the primary graduation of the container disposed in the opening 20 adjacent to the respective indicia markings. The indicia indicated at 39 through 45, are preferably readable from opposite sides of the frame 12 as illustrated in FIG. 3. The range of volumes referenced by the primary graduations 36 of each graduated container 26 through 32, are those which are normally prescribed in many beverages and mixed ingredient beverages served in the retail liquor service industry. The graduations on the containers 26 through 32 can be calibrated in metric units or other measurements systems also.

With the foregoing dimension and volumetric capacity of the graduated containers 26 through 32 as defined, the containers are also preferably about 7.88 inches in length and the overall outside dimensions of the frame 12 are approximately 11.75 inches length by 3.0 inches width by 7.88 inches height. With the above stated container dimensions, the quantities of liquid poured into the respective graduated containers to correspond to the volumes indicated by the primary graduations 36 are easily perceived to be distinctly different amounts whereby the timing of pouring liquids from an ungraduated container may be readily developed with practice using the apparatus 10.

By providing the frame 12 of the configuration illustrated, the frame may be oriented so that a person in training to develop skills of so called free pouring of beverages and beverage ingredients from an ungraduated container faces the open frame side 23 and may view the filling of each graduated container so that the timing of and the visual perception of the amount of liquid being poured can be correlated with the amount actually received in the graduated containers, respectively. However, when the trainee desires to test himself or be subjected to a test by an instructor, the frame 12 is turned the other way so that the backwall 22 prevents the trainee using the apparatus from viewing the amount of liquid being poured into the respective containers 26 through 32. The indicia on the top of the member 18 indicated at 39 through 45, indicates to the trainee, however, which amount to pour into the respective containers.

As shown in FIG. 1, it is preferable to use the apparatus in conjunction with a funnellike receiver, generally designated by the numeral 50. The receiver 50 includes a body portion 51 which preferably is provided in the shape of a beverage glass of a type commonly used in restaurants and drinking establishments. The receiver 50 also includes a reduced diameter spout portion 54 which extends into the interior of the container 31, by way of example, for supporting the receiver in the container and for channeling the flow of liquid directly into the container without risk of spillage.

FIG. 1 also illustrates a conventional bottle of the type used for containing various distilled alcoholic beverages, which bottle is designated by the numeral 60. The bottle 60 is typically ungraduated, that is to say that there are no markings on the bottle to indicate the quantity of liquid therein or liquid dispensed therefrom. The bottle 60 is normally provided with a pouring spout 62 of a type commercially available and commonly used in so called free pouring of beverages and beverage ingredients by a bartender or other person working in the preparation of beverages in the retail liquor service industry. The pouring spout 62 does not control the amount of liquid dispensed from the bottle when the bottle is inverted. The spout 62 may be of a type commercially available from Spill Stop Mfg. Co., Melrose Park, Ill. as their Model No. 285, for example. In a properly equipped establishment, the beverage bottles and those bottles including beverage ingredients would normally be uniformly equipped with a spout 62 or a spout having a similar dispensing rate and flow stream shape. However, a skilled drink mixer or bartender might also utilize several different types of bottles and pouring spouts and become familiar with their rate of pour characteristics so as to be able to develop a sense of timing and skill at determining a predetermined amount of liquid being dispensed from the bottle.

When training to develop or improve one's skills in pouring predetermined amounts of liquids from a bottle such as the bottle 60, the user of the apparatus 10 would normally position the frame 12 such that the graduated containers 26 through 32 could be readily viewed. The indicia 39 through 45 as well as the indicia marked on each graduated container 26 through 32 is readily viewable to the user so that when practicing the pouring of a particular predetermined amount, the receiver 50 would be placed on the selected container with the conduit portion 54 extending into the container and a predetermined quantity would be poured from the bottle 60 through the receiver into the associated container. The graduations 37 and 38, of course, indicate the margin of error from the desired amount poured as referenced by the graduation 36. Normally a liquid level anywhere between graduations 37 is an acceptable margin of error. By suitable practice exercises a user of the apparatus 10 will develop a sense of timing and pouring rate from a particular container which will achieve the desired amount poured so that when using ungraduated dispensing containers and ungraduated receiving containers, a high degree of accuracy may be obtained without the use of any measuring devices in the mixing and dispensing of beverages.

This so called free pouring technique, when preparing beverages, is much less time consuming in actual pratice than can be achieved with the use of a measuring container such as a jigger or shotglass. Moreover, the customer's perception of the amount being poured, when the bartender is in full view of the customer, is also more attractive to the customer when the so called free pouring technique is used. By using the apparatus 10, having a plurality of graduated containers which are of uniform size, the correlation of the pouring time and the actual amount being poured is easier to judge for the person practicing or training with the apparatus. The accuracy of the quantity being poured is also enhanced since the relatively small diameter tubular graduated containers 26 through 32, with precise primary graduations 36 located at points well below the mouth or flange 33, enables one to readily view the exact amount of liquid in the container taking into consideration the surface tension of the liquid and the fact that the actual level of the liquid is normally not indicated by a straight line. In this regard, inaccurate measurements are alleviated such as are experienced with the use of relatively large mouthed containers including jiggers or shotglasses which are filled to the rim as a means of determining the volume to be measured.

As previously mentioned, the graduated containers 26 through 32 may be easily emptied by inverting the frame 12 without danger of the containers falling out of the frame, thanks to the retaining rings 35. On the other hand, if it is desired to clean the individual graduated containers 26 through 32 or to replace one that may be accidentally broken, the retaining rings 35 may be easily removed by sliding them down the exterior surface of the container or, conversely, pulling the container firmly upward so that the retaining ring is held in place by the frame member 18.

Figure 4:
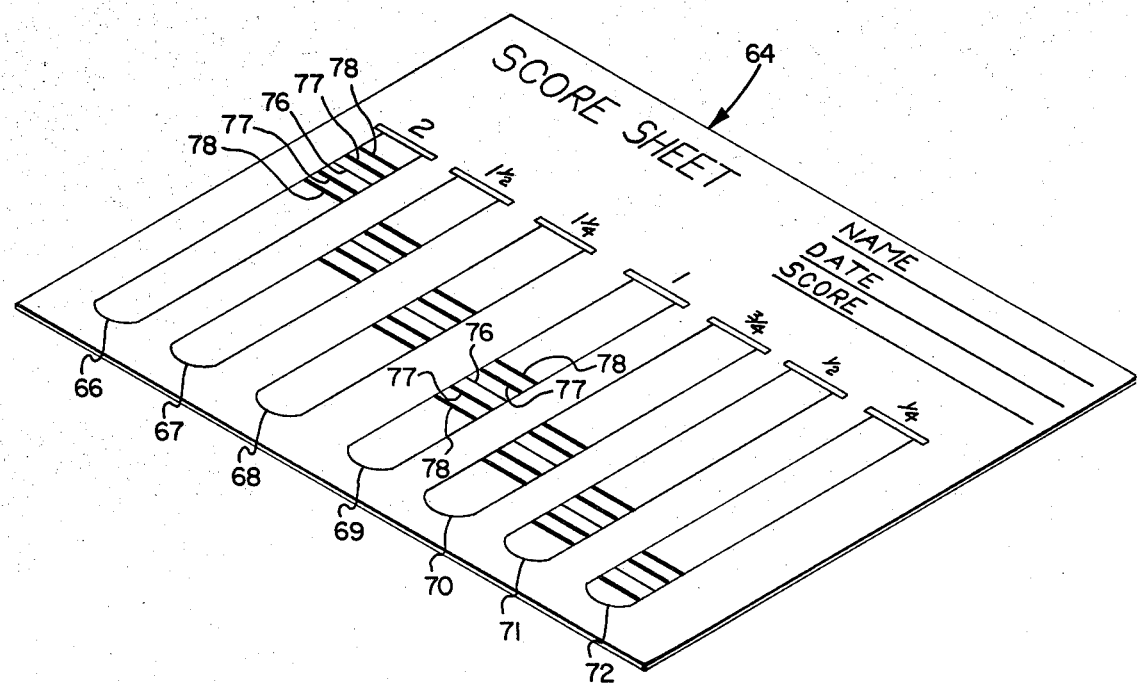
FIG. 4 is a perspective view of a score sheet adapted for use in conjunction with a testing method utilizing the apparatus illustrated in FIGS. 1 through 3.

Referring now to FIG. 4, there is illustrated a scoring device which can be conveniently used by an instructor in the process of testing a number of trainees as to their skills in pouring predetermined quantities of liquids using the apparatus 10. The scoring device illustrated in FIG. 4 is a printed sheet of paper or score sheet, generally designated by the numeral 64, and having facsimiles printed thereon, designated by the numerals 66, 67, 68, 69, 70, 71 and 72 corresponding to the shape and size of the graduated containers 26 through 32, respectively. Each of the facsimiles 66 through 72 is marked, as indicated by way of example for the facsimile 66, with a primary graduation 76 and first and second sets of secondary graduations 77 and 78 corresponding, respectively, to the primary graduations 36 and the secondary graduations 37 and 38 on the graduated containers 26 through 32. When testing a user of the apparatus 10, the apparatus would be turned so that the trainee could not view the sides of the graduated containers 26 through 32, but would only be able to view the tops of the containers and the indicia 39 through 45, when asked to pour a predetermined amount from an ungraduated container such as the bottle 60 into one of the selected graduated containers. After being tested to pour predetermined amounts into each of the respective graduated containers, the instructor utilizes the sheet 64 to place a pencil or crayon mark on each of the facsimiles 66 through 72 corresponding to the actual amount of liquid poured into the associated container during the test. Accordingly, the student or trainee then has a record of the degree of accuracy for pouring a particular amount to indicate whether further practice is warranted or not.

The apparatus 10 may, of course, also be used to calibrate various devices and containers used in and about a drinking establishment.

The advantages of the use of an apparatus such as the apparatus 10, will be readily apparent to those skilled in the art from the foregoing description. The accuracy of free pouring by bartenders and liquor service personnel is greatly improved through practice and testing with an apparatus in accordance with the present invention. The precisely graduated containers 26 through 32 also eliminate judgment errors on the part of trainees and instructors and the apparatus may be used without an instructor or aide during practice or training. The use of the graduated containers 26 through 32 provides immediate visual perception of the amount poured to further hone one's skills in so called free pouring of beverages and beverage ingredients. The apparatus 10 can also be perceived as an attractive item to use in practicing an otherwise rather boring procedure.

Although the frame 12 is provided with a backwall 22 to block the view of the graduations on the containers 26 through 32, the containers themselves may also be modified such that visual reading of the amount of liquid in a container may be made from only one side of the container. For example, the containers may be painted or otherwise made opaque along one side with a vertically extending window adjacent to the graduations on the other side so that the instructor or the trainee may view the amount of liquid in the container after a pouring exercise from one side only. As shown in FIG. 1, one or both of the end walls 16 may be provided with a diagram 17 indicating the correct method of reading the amount of liquid in the containers 26 through 32. Other indicia such as volume conversion charts may also be printed on the end walls 16.

Although a specific embodiment and method has been described in accordance with the present invention, those skilled in the art will recognize that various substitutions and modifications may be made to the apparatus and the method without departing from the scope and spirit of the invention as recited in the appended claims.

What I claim is:

1. Apparatus for training bartenders and the like to free pour predetermined quantities of liquids from one ungraduated container into another ungraduated container, said apparatus comprising:

a plurality of graduated containers supported by a frame, each of said graduated containers including at least a primary volume indicating graduation for indicating the quantity of liquid received in said graduated containers, respectively, and at least a first set of secondary graduations on each of said graduated containers for indicating a first margin of error with respect to said primary graduations of the excess or insufficiency of liquid poured into said graduated containers, respectively, and volume indicating indicia associated with each of said graduated containers for relating the primary graduations on said graduated containers to the amount of liquid poured into said graduated containers, respectively, for training a person to accurately pour a plurality of different predetermined quantities of liquid.

2. The apparatus set forth in claim 1 wherein:

each of said graduated containers includes a second set of secondary graduations for indicating a second margin of error greater than the first margin of error with respect to said primary graduations of the excess or insufficiency of liquid poured into said graduated containers, respectively.

3. The apparatus set forth in claim 1 wherein:

said graduated containers are of uniform size and cross-sectional shape so that the positions of at least said primary graduations are linearly correlated with the volume indicated by said primary graduations to assist the user in judging the respective predetermined quantities of liquid to be poured into said graduated containers, respectively.

4. The apparatus set forth in claim 3 wherein:

said graduated containers comprise a plurality of elongated open mouth tubes of uniform diameter.

5. The apparatus set forth in claim 4 wherein:

said tubes each include volume indicating indicia disposed thereon, respectively, and indicating the volume of said tube at said primary graduation.

6. The apparatus set forth in claim 4 wherein:

said tubes are transparent, and are aligned with each other side by said on said frame.

7. The apparatus set forth in claim 6 wherein:

said frame includes a base portion for supporting said tubes and wall means shielding said graduations from view by the user in at least one usable position of said apparatus so that the user may be tested to pour a specified predetermined quantity of liquid into a specified tube having at least a primary graduation relating to said specified predetermined quantity.

8. The apparatus set forth in claim 7 wherein:
said volume indicating indicia is on said frame adjacent to respective ones of said tubes for indicating the amount of liquid to be poured into said tubes, respectively.

9. The apparatus set forth in claim 4 including:
liquid receiver means removably insertable in the mouth of each of said tubes, respectively, said receiver means including an enlarged mouth for receiving liquid and means for channeling said liquid into said tube during a pouring operation.

10. The apparatus set forth in claim 3 including:
means for releasably retaining said graduated containers on said frame wherein said frame may be inverted to empty said containers without removing said containers from said frame, and said containers may be selectively removed from said frame.

11. The apparatus set forth in claim 10 wherein:
said graduated containers comprise elongated cylindrical tubes, said frame includes a base portion for supporting the bottoms of said tubes, and a member spaced from said base portion and including a plurality of openings for supporting said tubes, respectively, and said retaining means includes resilient ring means disposed around said tubes and operable to prevent said tubes from slipping out of said frame when said frame is inverted.

12. Apparatus for training persons to free pour predetermined quantities of liquids from one container into another container without the use of a volume measuring device, said apparatus comprising:
a plurality of uniformly sized graduated containers, each of said graduated containers including a primary graduation and a set of secondary graduations for indicating a margin of error with respect to said primary graduation of the excess or insufficiency of liquid poured into said graduated container, means for supporting said graduated containers generally side by side in a position for receiving liquid therein, respectively, said means for supporting said graduated containers including means to prevent viewing said primary graduations on said graduated containers in at least one usable position of said apparatus, and volume indicating indicia associated with each of said graduated containers for relating primary graduations on each of said graduated containers to the amount of liquid to be poured into said graduated containers, respectively, for training a person to accurately pour a plurality of different predetermined quantities of liquid.

13. The apparatus set forth in claim 12 wherein:
said means for supporting said graduated containers includes a frame having a wall shielding a major portion of said graduated containers from the view of the user in at least said one usable position of said apparatus so that the user may be tested to pour a specified predetermined quantity of liquid into a specified graduated container without viewing the liquid level in said graduated container.

14. The apparatus set forth in claim 13 wherein:
said graduated containers comprise a plurality of elongated open mouthed tubes of uniform diameter.

15. The apparatus set forth in claim 14 wherein:
said tubes each include volume indicating indicia disposed thereon, respectively, and indicating the volume of said tube at said primary graduation.

16. Apparatus for training bartenders and the like to free pour a plurality of different predetermined quantities of liquids from one ungraduated container into another ungraduated container, said apparatus comprising:
a plurality of graduated containers comprising open mouthed transparent tubes of uniform diameter and length, each of said graduated containers including respective primary volume indicating graduations for indicating the quantity of liquid received in said graduated containers, respectively, and volume indicating indicia on each of said graduated containers for indicating the volume of said graduated containers at said primary graduations, respectively, a frame including a base portion for supporting said graduated containers and wall means for shielding said graduations from view by the user in at least one usable position of said apparatus, and volume indicating indicia on said frame adjacent to respective ones of said graduated containers and corresponding to the volume indicating indicia on said graduated containers, respectively, so that the user may be tested to pour a specified predetermined quantity of liquid into a specified graduated container having at least a primary graduation relating to said specified predetermined quantity.

17. A method for testing the skill level of a person for pouring selected predetermined quantities of liquid from a specified ungraduated container into another ungraduated container, said method comprising the steps of:
providing a testing apparatus comprising a plurality of uniformly sized graduated containers, each of said graduated containers having a series of graduations thereon including a primary graduation different from the primary graduation of the other graduated containers for determing the specified volume of said graduated container, and secondary graduations for determing an acceptable margin of error of the specified volume of liquid poured into said graduated container, said graduated containers being arranged on said apparatus whereby the quantity of liquid poured into a specified graduated container may not be viewed by said person pouring liquid during a test;
requiring said person to pour predetermined quantities of liquid into selected ones of said graduated containers in accordance with the volume of said graduated containers indicated by said primary graduations and by indicia on said apparatus corresponding to respective ones of said primary graduations; and
reading the respective volumes of liquids poured into said graduated containers to determine said person's skill at pouring said selected quantities of liquid.

18. The method set forth in claim 17 including the steps of:
recording the respective volumes of liquid poured into said graduated containers by;
providing a score sheet including respective printed facsimiles of each graduated container including said primary and secondary graduations; and
marking said score sheet by indicating the location of the liquid level in each graduated container filled to indicate the accuracy of the pouring operations.

* * * * *

UNITED STATES PATENT AND TRADEMARK OFFICE
CERTIFICATE OF CORRECTION

PATENT NO. : 4,482,327
DATED : November 13, 1984
INVENTOR(S) : David A. Brady

It is certified that error appears in the above-identified patent and that said Letters Patent is hereby corrected as shown below:

Column 8, line 64, the first "said" should be -side--.

Column 10, line 39, "determing" should be --determining--.

Column 10, line 41, "determing" should be --determining--.

Signed and Sealed this

Ninth Day of April 1985

[SEAL]

Attest:

DONALD J. QUIGG

Attesting Officer

Acting Commissioner of Patents and Trademarks